United States Patent
Lakshminarayan et al.

(10) Patent No.: US 10,999,789 B2
(45) Date of Patent: May 4, 2021

(54) SYSTEMS AND METHODS FOR REDUCING INTERFERENCE IN A TDMA BASED WIRELESS NETWORK

(71) Applicant: Ademco Inc., Golden Valley, MN (US)

(72) Inventors: Nagaraj Chickmagalur Lakshminarayan, Bangalore (IN); Arun Handanakere Sheshagiri, Bangalore (IN); Anand Kavatekar Narayan Rao, Bangalore (IN); Sachin Prakash Maganti, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 20 days.

(21) Appl. No.: 16/351,746

(22) Filed: Mar. 13, 2019

(65) Prior Publication Data
US 2020/0296664 A1    Sep. 17, 2020

(51) Int. Cl.
*H04W 48/20*    (2009.01)
*H04W 4/80*    (2018.01)
(Continued)

(52) U.S. Cl.
CPC ............. *H04W 48/20* (2013.01); *H04W 4/80* (2018.02); *H04W 40/244* (2013.01);
(Continued)

(58) Field of Classification Search
CPC ..... H04W 48/20; H04W 40/244; H04W 4/80; H04W 72/0446; H04B 1/713; H04B 1/74; H04J 3/1694
See application file for complete search history.

(56) References Cited

U.S. PATENT DOCUMENTS 6,690,657 B1 *    2/2004    Lau ...................... H04B 7/2606
                                                         370/315
8,228,859 B2    7/2012    Wang et al.
(Continued)

FOREIGN PATENT DOCUMENTS

WO        98/19400 A1    5/1998
WO    2017/143320 A1    8/2017

OTHER PUBLICATIONS

Search report from corresponding EP application 20161675.2 dated Jul. 14, 2020.

*Primary Examiner* — Brian T O Connor
(74) *Attorney, Agent, or Firm* — Fredrikson & Byron, P.A.

(57) ABSTRACT

Systems and methods for reducing interference in a TDMA based wireless network are provided. Such systems and methods can include a wireless access point forming a wireless network, the wireless access point selecting a first information channel, a second information channel, and a plurality of operating channel sequences from a plurality of wireless network channels used by the wireless network, the wireless access point assigning a first operating channel sequence of the plurality of operating channel sequences to the wireless access point and a second operating channel sequence of the plurality of operating channel sequences to a wireless repeater, the wireless access point hopping between each one of the first operating channel sequence in different ones of superframes used by the wireless network, and the wireless repeater hopping between each one of the second operating channel sequence in the different ones of the superframes.

20 Claims, 5 Drawing Sheets

(51) Int. Cl.
*H04W 40/24* (2009.01)
*H04W 72/04* (2009.01)
*H04B 1/713* (2011.01)
*H04B 1/74* (2006.01)
*H04J 3/16* (2006.01)

(52) U.S. Cl.
CPC ......... *H04W 72/0446* (2013.01); *H04B 1/713* (2013.01); *H04B 1/74* (2013.01); *H04J 3/1694* (2013.01)

(56) References Cited

U.S. PATENT DOCUMENTS

| | | | |
|---|---|---|---|
| 9,312,976 | B2 | 4/2016 | Zhang |
| 9,736,703 | B2 * | 8/2017 | Goldsmith ............ H04W 24/02 |
| 9,913,232 | B2 * | 3/2018 | Seo ................... H04W 56/0015 |
| 10,039,052 | B2 * | 7/2018 | Zhou ...................... H04W 48/20 |
| 10,051,494 | B2 * | 8/2018 | Rengarajan ........... H04W 24/02 |
| 10,091,786 | B2 * | 10/2018 | Schmidl ................ H04L 5/0053 |
| 10,499,405 | B2 * | 12/2019 | Lee ..................... H04W 72/082 |
| 10,813,094 | B2 * | 10/2020 | Schmidl ................ H04L 5/0053 |
| 2017/0273013 | A1 * | 9/2017 | Edara ....................... H04L 67/10 |
| 2018/0324607 | A1 | 11/2018 | Rengarajan et al. |
| 2019/0281608 | A1 * | 9/2019 | Huang ................. H04W 16/00 |
| 2020/0068578 | A1 * | 2/2020 | Lee .................... H04W 64/003 |

* cited by examiner

SYSTEMS AND METHODS FOR REDUCING INTERFERENCE IN A TDMA BASED WIRELESS NETWORK

FIELD

The present invention relates generally to wireless networks. More particularly, the present invention relates to systems and methods for reducing interference in a time-division multiple access (TDMA) based wireless network.

BACKGROUND

Known wireless networks that employ one or more signal repeaters suffer from several known problems. First, known wireless networks are limited by a number of the signal repeaters and devices that can be connected to a single access point, which limits an overall coverage area of a wireless network. Second, known wireless networks are susceptible to interference from other wireless systems that operate in an overlapping frequency band.

In view of the above, there is a need and an opportunity for improved systems and methods.

DETAILED DESCRIPTION

Figure 1:
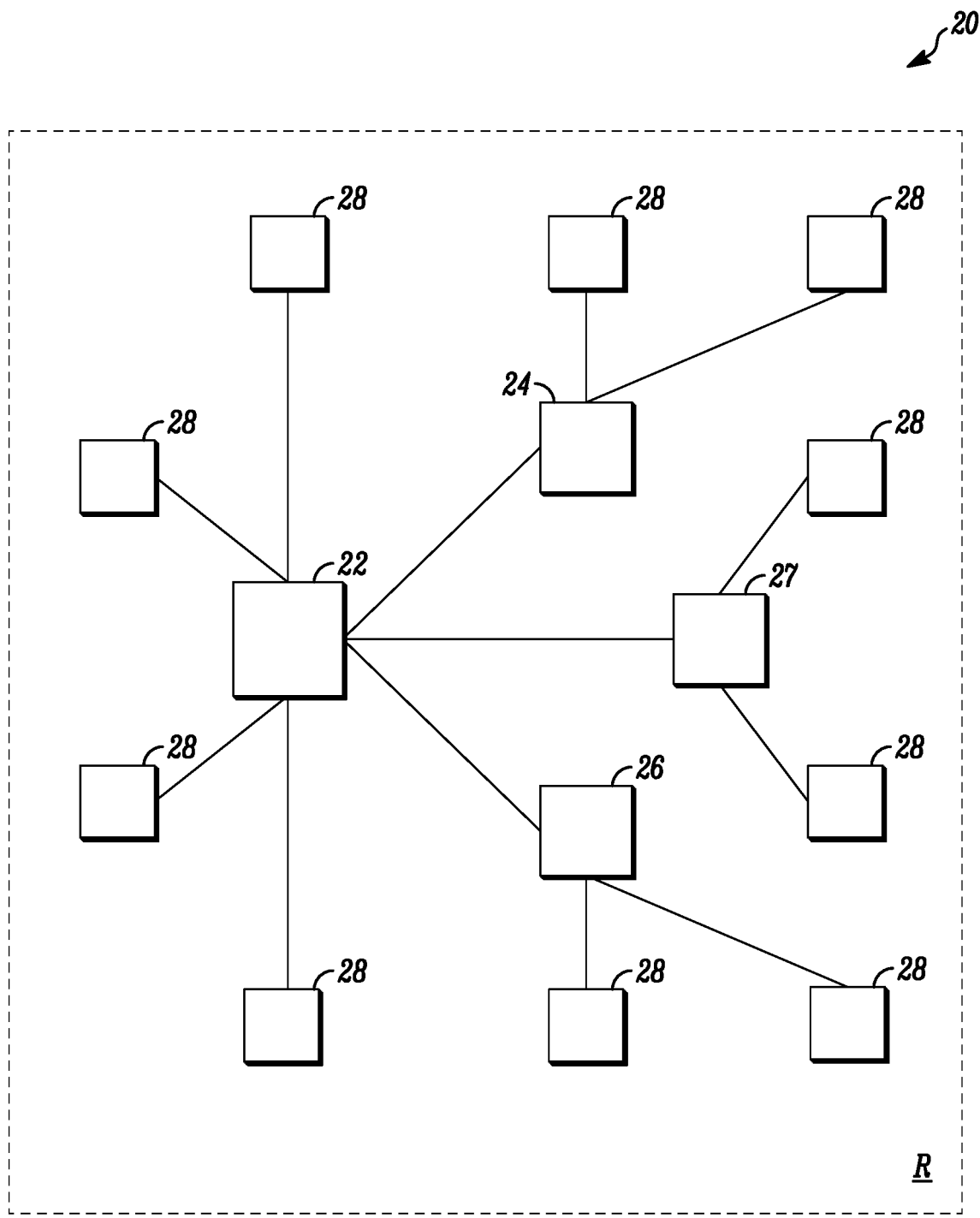
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for reducing interference in a TDMA based wireless network. For example, the TDMA based wireless network can include a wireless access point operating in a specific frequency band, such as the 2.4 GHz frequency band, a wireless repeater, and a plurality of devices. In accordance with disclosed embodiments, the wireless access point can select a first information channel and a second information channel from a plurality of wireless network channels used by the TDMA based wireless network and can select a plurality of operating channel sequences from the plurality of wireless network channels for use by the wireless access point and the wireless repeater. In some embodiments, the wireless access point can select the plurality of operating channel sequences to be in between and non-overlapping with the first information channel and the second information channel. Furthermore, in some embodiments, the wireless access point can assign a first operating channel sequence of the plurality of operating channel sequences to the wireless access point and a second operating channel sequence of the plurality of operating channel sequences to the wireless repeater.

In some embodiments, beacon messages can be broadcast on the plurality of operating channels in dedicated operating channel slots in superframes used by the TDMA based wireless network, information messages can be broadcast on the first information or the second information channel in dedicated information channel slots in the superframes, and other communication messages between the wireless access point, the wireless repeater, and/or each of the plurality of devices can be broadcast in dedicated alarm slots and AP slots in the superframes. In some embodiments, the information channel slots can be located between the operating channel slots in the superframes.

In some embodiments, the wireless access point can select each of the plurality of operating channel sequences to overlap with different ones of a plurality of interfering channels used by another wireless network that operates in the specific frequency band of the TDMA based wireless network. For example, the wireless access point can select a respective first one of each of the plurality of operating channel sequences to overlap with a first one of the plurality of interfering channels. Similarly, the wireless access point can select a respective second one of each of the plurality of operating channel sequences to overlap with a second one of the plurality of interfering channels that is different than first one of the plurality of interfering channels. Likewise, the wireless access point can select a respective third one of each of the plurality of operating channel sequences to overlap with a third one of the plurality of interfering channels that is different than both the first one of the plurality of interfering channels and the second one of the plurality of interfering channels. In some embodiments, the third one of the plurality of interfering channels can be the same as the first one of the plurality of interfering channels or the second one of the plurality of interfering channels.

In some embodiments, the another wireless network that uses the plurality of interfering channels can include a Wi-Fi network. In some embodiments the plurality of interfering channels can include all the channels of the Wi-Fi network. Additionally, or alternatively, in some embodiments, the plurality of interfering channels can include channels 1, 6, and 11 of the Wi-Fi network. Accordingly, in these embodiments, the respective first, second, and third ones of each of the plurality of operating channel sequences can overlap with any one of channels 1, 6, and 11 of the Wi-Fi network.

In some embodiments, the wireless access point can scan a region in which the wireless access point is deployed to identify potential interference on the plurality of interfering channels or from other sources of interference. Then, the wireless access point can select the first information channel and the second information channel based on a level of the potential interference. For example, the wireless access point can select the first information channel and the second information channel so as to overlap with the plurality of interfering channels where the level of the potential interference is the lowest and so as to be far enough apart from one other so as to overlap with different ones of the plurality of interfering channels. In some embodiments, the wireless access point can select each of the plurality of operating channel sequences so as to not overlap with the plurality of interfering channels where the level of the potential interference is the largest.

Additionally or alternatively, in some embodiments, the wireless access point can select the first information channel and the second information channel from a predefined list of preconfigured combinations of the plurality of wireless network channels. In such embodiments, the wireless access point can select each of the plurality of operating channel sequences from entries on the predefined list that are cross-referenced with the first information channel and the second information channel.

In any embodiment, the first information channel and the second information channel can be selected to prevent conflicting broadcasts within the superframes used by the TDMA based wireless network. For example, each of the wireless access point and the wireless repeater can be assigned a respective slot in each of the superframes for broadcasting on the first information channel and/or the second information channel, thereby ensuring that each device in the TDMA based wireless network can broadcast without direct interference from any other device in the TDMA based wireless network.

In some embodiments, each of the wireless access point and the wireless repeater can hop between the first information channel and the second information channel in different ones of the superframes and can hop between channels of a respective one of the plurality of operating channel sequences in different ones of the superframes. Accordingly, in each of the superframes, each of the wireless access point and the wireless repeater can broadcast information on one of the first or second information channels and can broadcast a respective beacon on one of the channels in the respective one of the plurality of operating channel sequences.

For example, in some embodiments, the wireless access point can broadcast an access point beacon in a first slot of a first one of the superframes on a first channel of a first operating channel sequence of the plurality of operating channel sequences. In response to receiving the access point beacon, the wireless repeater can broadcast a wireless repeater beacon in a second slot of the first one of the superframes on a first channel of a second operating channel sequence of the plurality of operating channel sequences. In some embodiments, the wireless repeater beacon can be a copy of the access point beacon.

Then, the wireless access point can rebroadcast the access point beacon in a first slot of a next one of the superframes and can hop from the first channel of the first operating channel sequence to a second channel of the first operating channel sequence. In response to receiving the access point beacon, the wireless repeater can rebroadcast the wireless repeater beacon in a second slot of the next one of the superframes and hop from the first channel of the second operating channel sequence to a second channel of the second operating channel sequence.

Then, the wireless access point can rebroadcast the access point beacon in a first slot of another next one of the superframes and can hop from the second channel of the first operating channel sequence to a third channel of the first operating channel sequence. In response to receiving the access point beacon, the wireless repeater can rebroadcast the wireless repeater beacon in a second slot of the another next one of the superframes and hop from the second channel of the second operating channel sequence to a third channel of the second operating channel sequence.

Then, the wireless access point can rebroadcast the access point beacon in a first slot of yet another next one of the superframes and can hop from the third channel of the first operating channel sequence back to the first channel of the first operating channel sequence. In response to receiving the access point beacon, the wireless repeater can rebroadcast the wireless repeater beacon in a second slot of the yet another next one of the superframes and hop from the third channel of the second operating channel sequence back to the first channel of the second operating channel sequence.

Such rebroadcasting and channel hopping can continue as described herein during operation of the TDMA based wireless network. In some embodiments, the channel hopping can occur every 245 milliseconds. However, embodiments where the channel hopping occurs at intervals greater than 245 milliseconds and less than 245 milliseconds are contemplated. In some embodiments, the channel hopping can be executed without data fragmentation across channels. In particular, in some embodiments, systems and methods as described herein can send a single set of data, such as a beacon message over a single channel, which is different from standard frequency hopping that allows for fragmentation of data across multiple channels.

In some embodiments, the TDMA based wireless network can include a plurality of wireless repeaters in the same level, and in these embodiments, each of the plurality of wireless repeaters in the same level can broadcast its wireless repeater beacon simultaneously in the respective slot of each of the superframes dedicated to that level and shifted or offset from the first slot.

Additionally or alternatively, in some embodiments, the TDMA based wireless network can include a first plurality of wireless repeaters in a first level and a second plurality of wireless repeaters in a second level. In these embodiments, each of the first plurality of wireless repeaters can broadcast its wireless repeater beacon simultaneously in the respective slot of each of the superframes dedicated to the first level and shifted or offset from the first slot, and each of the second plurality of wireless repeaters can broadcast its wireless repeater beacon simultaneously in the respective slot of each of the superframes dedicated to the second level and shifted or offset from the first slot and the respective slot of each of the superframes dedicated to the first level.

In some embodiments, each of the plurality of devices can broadcast packets to the wireless access point for use in assessing a status of the region, directing the wireless access point to execute an action, or transmitting or receiving other information or instructions. Similarly, each of the plurality of devices can receive packets broadcast from the wireless access point. As described herein, each of the plurality of devices can either communicate with the wireless access point directly using the first operating channel sequence or indirectly via the wireless repeater using the second operating channel sequence.

For example, a first one of the plurality of devices can use the first information channel and the second information channel to identify the first operating channel sequence or the second operating channel sequence to use for communicating directly or indirectly with the wireless access point. In some embodiments, the wireless access point can assign the first one of the plurality of devices the first information channel, the second information channel, and an initial operating channel sequence of the plurality of operating channel sequences to use for communicating directly or indirectly with the wireless access point, and in some embodiments, the initial operating channel sequence can include the first operating channel sequence or the second operating channel sequence.

When the first one of the plurality of devices fails to communicate with the wireless access point using the initial operating channel sequence, the first one of the plurality of devices can use the first information channel and/or the second information channel to identify a subsequent operating channel sequence of the plurality of operating channel sequences for communicating directly or indirectly with the wireless access point, and in some embodiments, the subsequent operating channel sequence can include the first operating channel sequence or the second operating channel sequence. In some embodiments, the first one of the plurality of devices can use the first information channel and/or the second information channel to identify the subsequent operating channel sequence based on a current location of the first one of the plurality of devices relative to a fixed location of the wireless access point or the wireless repeater.

FIG. 1 is a block diagram of a system 20 in accordance with disclosed embodiments. As seen in FIG. 1, the system 20 can include a wireless access point 22, a first wireless repeater 24, a second wireless repeater 26, a third wireless repeater 27, and a plurality of devices 28. The wireless access point 22 can create a wireless network in an ambient region R, and each of the plurality of devices 28 can communicate with the wireless access point 22 via the wireless network either directly or indirectly via the first wireless repeater 24, the second wireless repeater 26, or the third wireless repeater 27.

Figure 2:
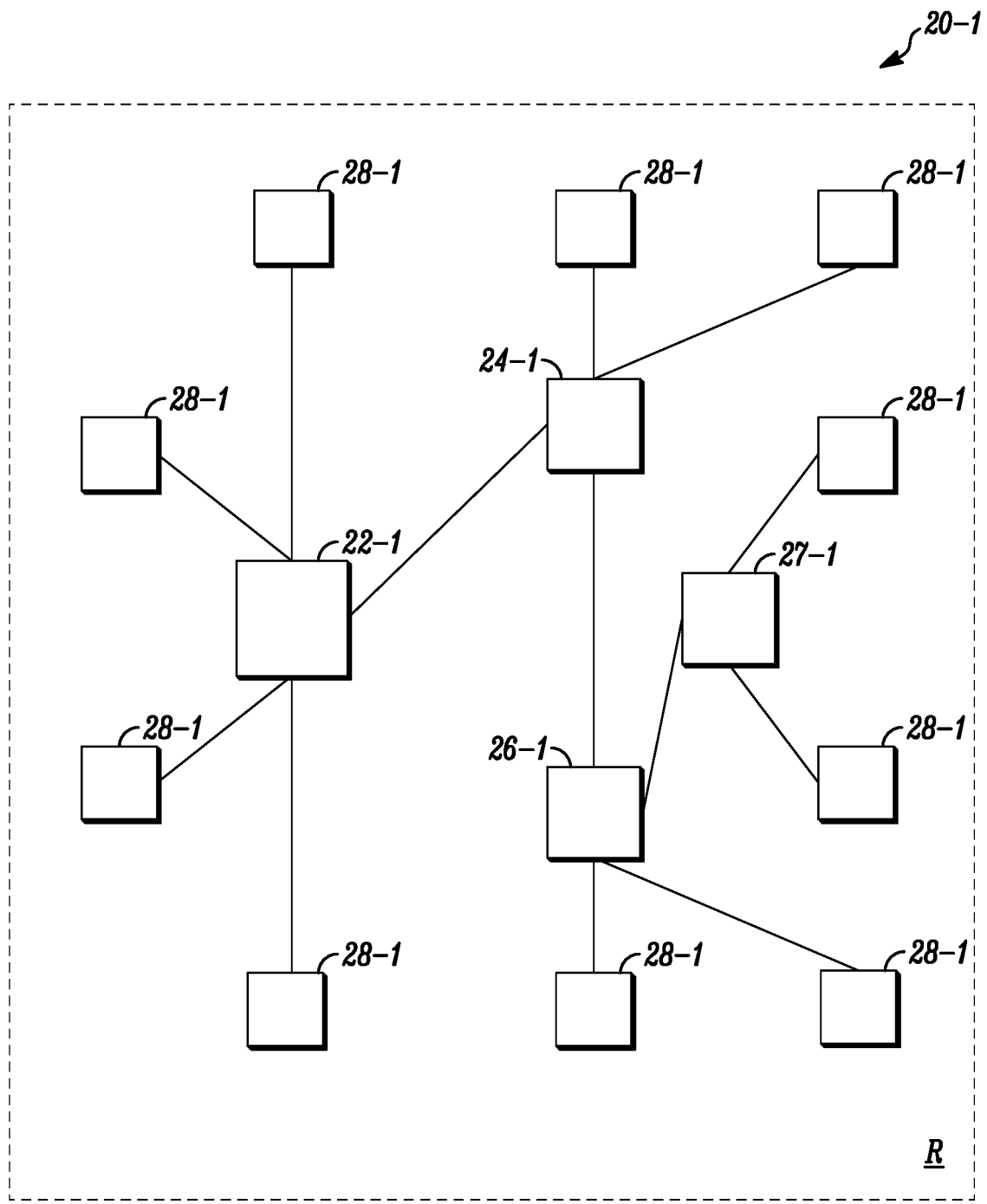
FIG. 2 is a block diagram of a system in accordance with disclosed embodiments.

FIG. 2 is a block diagram a system 20-1 in accordance with disclosed embodiments. As seen in FIG. 2, the system 20-1 can include a wireless access point 22-1, a first wireless repeater 24-1 that can be a first level repeater, a second wireless repeater 26-1 that can be a second level repeater, a third wireless repeater 27-1 that can be a third level repeater, and a plurality of devices 28-1. The wireless access point 22-1 can create a wireless network in an ambient region R-1, and each of the plurality of devices 28-1 can communicate with the wireless access point 22-1 via the wireless network either directly or indirectly via one or more of the first wireless repeater 24-1, the second wireless repeater 26-1, and the third wireless repeater 27-1. For example, the second wireless repeater 26-1 can wirelessly communicate with the first wireless repeater 24-1 to extend the wireless network, and the third wireless repeater 27-1 can wirelessly communicate with the second wireless repeater 26-1 to further extend the wireless network.

Figure 3:
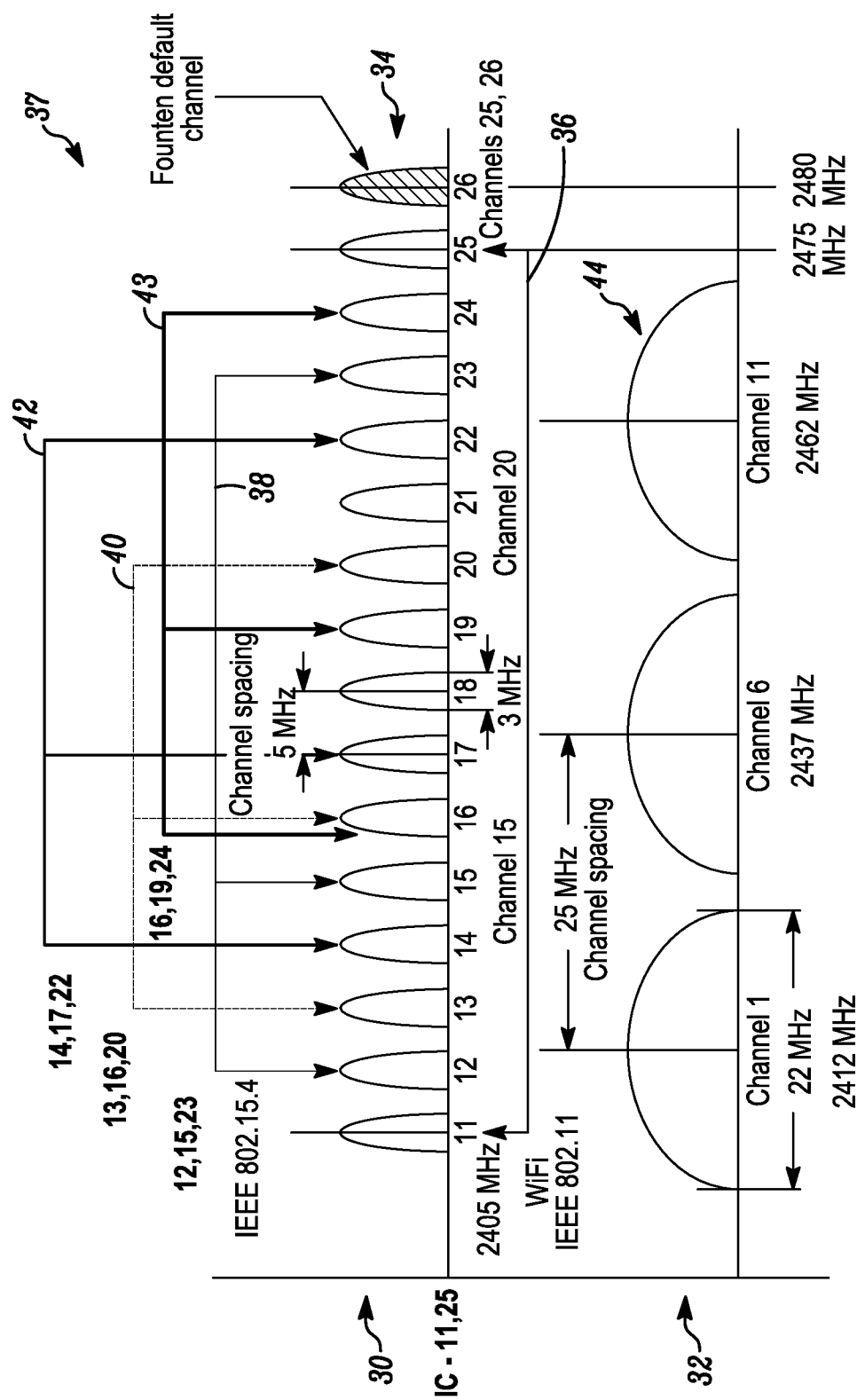
FIG. 3 is a graph of network channels in accordance with disclosed embodiments.

FIG. 3 is a graph of network channels in accordance with disclosed embodiments and illustrates channels used by a first wireless network 30 formed by the wireless access point 22, 22-1 and channels used by a second wireless network 32 that may interfere with the first wireless network 30. As seen in FIG. 3, the first wireless network 30 can conform to the IEEE 802.15.4 standard, can operate within the 2.4 GHz frequency band, and can use a plurality of channels 34. As seen in FIG. 3, each of the plurality of channels 34 can be 3 MHz wide and separated by 5 MHz peak-to-peak. Some of the plurality of channels 34 can be allocated as information channels 36 for the first wireless network 30. For example, as seen in FIG. 3, in some embodiments, the information channels 36 can include channel 11 and channel 25 of the plurality of channels 34.

As seen in FIG. 3, in some embodiments, the wireless access point 22, 22-1 can allocate some the plurality of channels 34 as a plurality of operating channel sequences 37 for the first wireless network 30. For example, the wireless access point 22, 22-1 can assign a first operating channel sequence 38 of the plurality of operating channel sequences 37, such as channels 12, 15, and 23 of the plurality of channels 34, to the wireless access point 22, 22-1, can assign a second operating channel sequence 40 of the plurality of operating channel sequences 37, such as channels 13, 16, and 20 of the plurality of channels 34, to the first wireless repeater 24, 24-1, can assign a third operating channel sequence 42 of the plurality of operating channel sequences 37, such as channels 13, 16, and 20 of the plurality of channels 34, to the second wireless repeater 26, and can assign a fourth operating channel sequence 43 of the plurality of operating channel sequences 37, such as channels 16, 19, and 24 of the plurality of channels 34, to the third wireless repeater 27.

As seen in FIG. 3, the second wireless network 32 can include a Wi-Fi network that conforms to the IEEE 802.11 standard and operates in the 2.4 GHz frequency band. As known in the art, IEEE 802.11 Wi-Fi networks can use a plurality of channels 44 that include channels 1, 6, and 11, and because channels 1, 6, and 11 are non-overlapping, one of channels 1, 6, and 11 can be selected as a primary operating channel for the second wireless network 32. To increase the robustness of the system 20, 20-1, each of the plurality of operating channel sequences 37 of the first wireless network 30 can be selected to overlap with different ones of the channels 1, 6, and 11 of the second wireless network 32.

Figure 4:
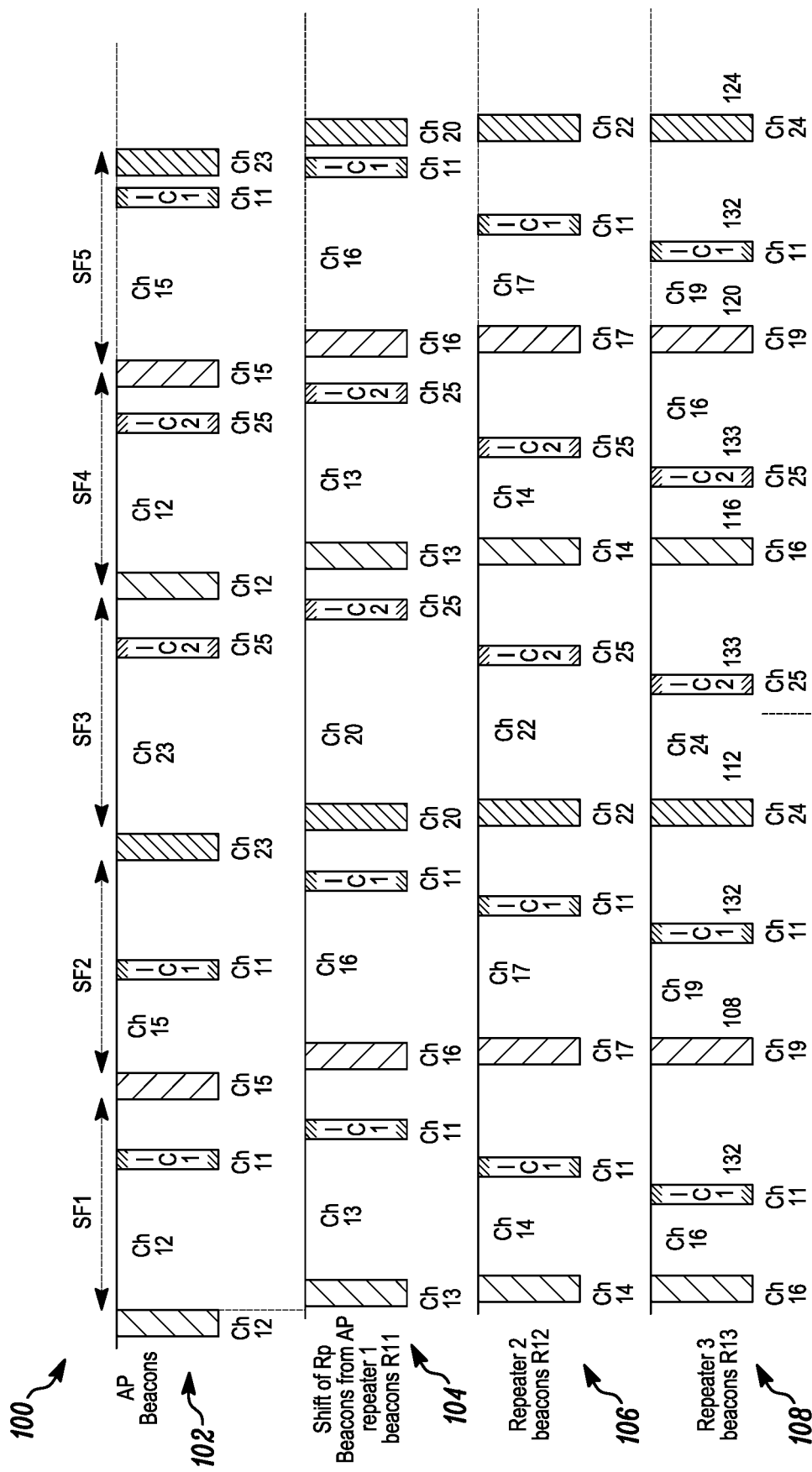
FIG. 4 is a flow diagram of a method in accordance with disclosed embodiments.

FIG. 4 is a flow diagram of a method 100 for transmitting a beacon signal to each of the plurality of devices 28 when each of the first wireless repeater 24, the second wireless repeater 26, and the third wireless repeater 27 are in one level in accordance with disclosed embodiments, such as in the system 20 of FIG. 1. As seen in FIG. 4, the wireless access point 22 can initially broadcast an access point beacon in a first slot of a superframe SF1 on channel 12 of the first operating channel sequence 38 and can hop between channels 12, 15, and 23 of the first operating channel sequence 38 to rebroadcast the access point beacon in a first slot of subsequent superframes, as in 102. In response to receiving the access point beacon, the first wireless repeater 24 can initially broadcast a first wireless repeater beacon in a second slot of the superframe SF1 on channel 13 of the second operating channel sequence 40 and can hop between channels 13, 16, and 20 of the second operating channel sequence 40 to rebroadcast the first wireless repeater beacon in a second slot of the subsequent superframes, as in 104.

Similarly, in response to receiving the access point beacon, the second wireless repeater 26 can initially broadcast a second wireless repeater beacon in the second slot of the superframe SF1 on channel 14 of the third operating channel sequence 42 and can hop between channels 14, 17, and 22 of the third operating channel sequence 42 to rebroadcast the second wireless repeater beacon in the second slot of the subsequent superframes, as in 106, and the third wireless repeater 27 can initially broadcast a third wireless repeater beacon in the second slot of the superframe SF1 on channel 16 of the fourth operating channel sequence 43 and can hop between channels 16, 19, and 24 of the fourth operating channel sequence 43 to rebroadcast the third wireless repeater beacon in the second slot of the subsequent superframes, as in 108. In some embodiments, the first wireless repeater beacon, the second wireless repeater beacon, and the third wireless repeater beacon can be copies of the access point beacon.

Figure 5:
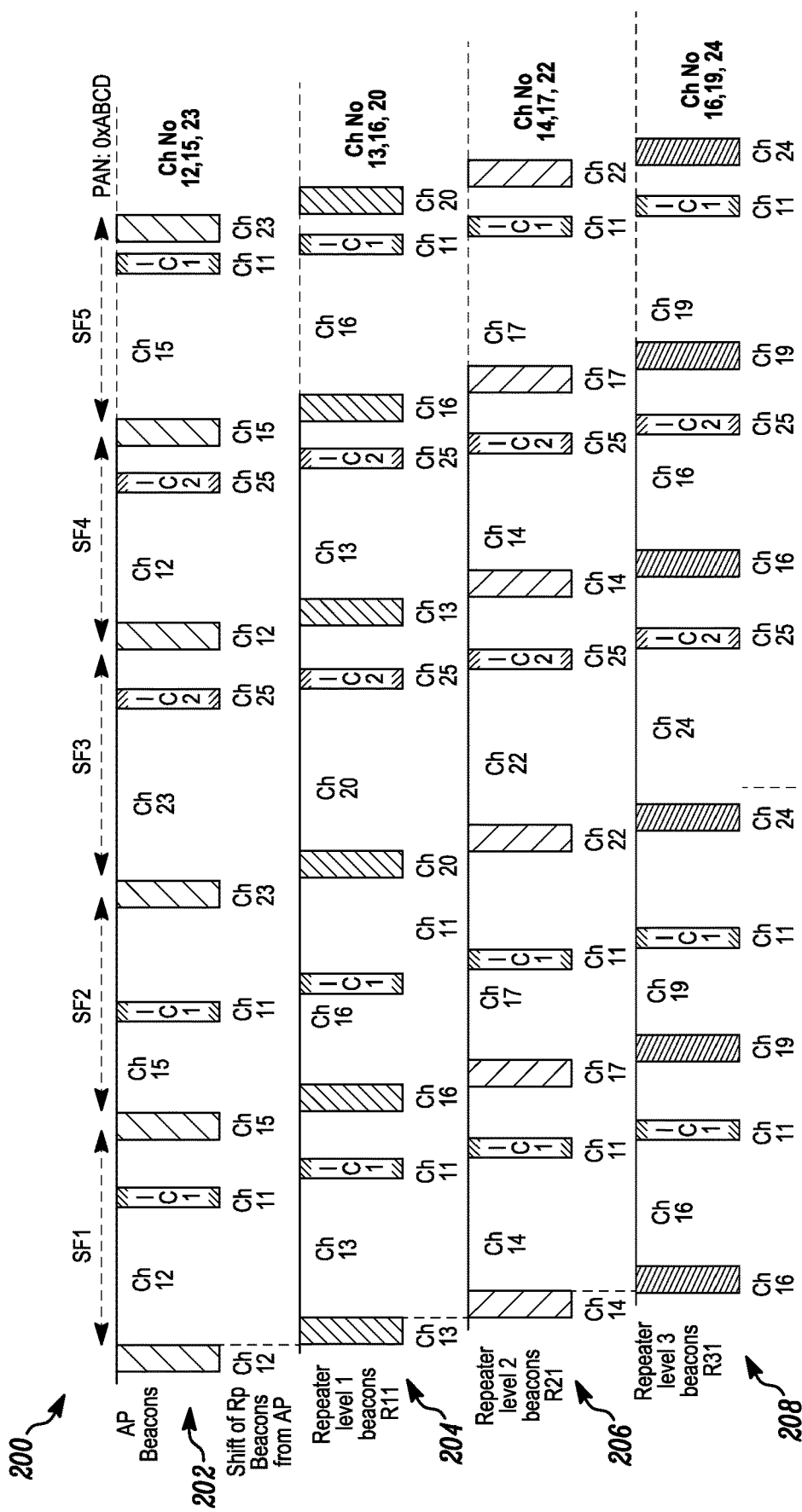
FIG. 5 is a flow diagram of a method in accordance with disclosed embodiments.

FIG. 5 is a flow diagram of a method 200 for transmitting a beacon signal to each of the plurality of devices 28-1 when the first wireless repeater 24-1 is in a first level, the second wireless repeater 26-1 is in a second level, and the third wireless repeater 27-1 is in a third level in accordance with disclosed embodiments, such as in the system 20-1 of FIG. 2. As seen in FIG. 5, the wireless access point 22-1 can initially broadcast an access point beacon in a first slot of a superframe SF1 on channel 12 of the first operating channel sequence 38 and can hop between channels 12, 15, and 23 of the first operating channel sequence 38 to rebroadcast the access point beacon in a first slot of subsequent superframes, as in 202.

In response to receiving the access point beacon, the first wireless repeater 24-1 can initially broadcast a first wireless repeater beacon in a second slot of the superframe SF1 on channel 13 of the second operating channel sequence 40 and can hop between channels 13, 16, and 20 of the second operating channel sequence 40 to rebroadcast the first wireless repeater beacon in a second slot of the subsequent superframes, as in 204. In some embodiments, the second slot can be shifted or offset from the first slot.

In response to receiving the first wireless repeater beacon, the second wireless repeater 26 can initially broadcast a second wireless repeater beacon in a third slot of the superframe SF1 on channel 14 of the third operating channel sequence 42 and can hop between channels 14, 17, and 22 of the third operating channel sequence 42 to rebroadcast the third wireless repeater beacon in a third slot of the subsequent superframes, as in 206. In some embodiments, the third slot can be shifted or offset from the first slot and the second slot.

In response to receiving the second wireless repeater beacon, the third wireless repeater 27 can initially broadcast a third wireless repeater beacon in a fourth slot of the superframe SF1 on channel 16 of the fourth operating channel sequence 43 and can hop between channels 16, 19, and 24 of the fourth operating channel sequence 43 to rebroadcast the third wireless repeater beacon in a fourth slot of the subsequent superframes, as in 208. In some embodiments, the fourth slot can be shifted or offset from the first, second, and third slots, and in some embodiments, the first wireless repeater beacon, the second wireless repeater beacon, and the third wireless repeater beacon can be copies of the access point beacon.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a wireless access point that operates in a frequency band and forms a first wireless network; and
   a first wireless repeater,
   wherein the wireless access point selects a first information channel, a second information channel, and a plurality of operating channel sequences from a plurality of wireless network channels used by the first wireless network,
   wherein the wireless access point assigns a first operating channel sequence of the plurality of operating channel sequences to the wireless access point and a second operating channel sequence of the plurality of operating channel sequences to the first wireless repeater,
   wherein the first operating channel sequence includes a first plurality of channels,
   wherein the second operating channel sequence includes a second plurality of channels that is different than the first plurality of channels,
   wherein the wireless access point hops between the first information channel and the second information channel and between each one of the first plurality of channels in different ones of superframes used by the first wireless network,
   wherein the first wireless repeater hops between the first information channel and the second information channel and between each one of the second plurality of channels in the different ones of the superframes,
   wherein the wireless access point broadcasts an access point beacon in a first slot of one of the superframes on one of the first plurality of channels,
   wherein, responsive to receiving the access point beacon, the first wireless repeater broadcasts a first wireless repeater beacon in a second slot of the one of the superframes on one of the second plurality of channels, wherein the one of the first plurality of channels and the one of the second plurality of channels are associated with the one of the superframes, wherein the second slot is shifted or offset from the first slot,
   wherein the wireless access point hops from the one of the first plurality of channels to another of the first plurality of channels to rebroadcast the access point beacon in a first slot of the another of the superframes via the another of the first plurality of channels, and
   wherein, responsive to receiving the rebroadcasted access point beacon, the first wireless repeater hops from the one of the second plurality of channels to another of the second plurality of channels to rebroadcast the first wireless repeater beacon in a second slot of the another of the superframes via the another of the second plurality of channels.

2. The system of claim 1 wherein first one of the first plurality of channels and a first one of the second plurality of channels overlap with a first one of a plurality of interfering channels of a second wireless network that operates in the frequency band,
   wherein a second one of the first plurality of channels and a second one of the second plurality of channels overlap with a second one of the plurality of interfering channels that is different than first one of the plurality of interfering channels, and
   wherein a third one of the first plurality of channels and a third one of the second plurality of channels overlap with a third one of the plurality of interfering channels.

3. The system of claim 2 wherein the first wireless network includes a ZigBee network, the second wireless network includes a Wi-Fi network, the frequency band includes a 2.4 GHz band, and the plurality of interfering channels includes all channels of the Wi-Fi network.

4. The system of claim 1 further comprising:
   a second wireless repeater,
   wherein the wireless access point assigns a third operating channel sequence of the plurality of operating channel sequences to the second wireless repeater,
   wherein the third operating channel sequence includes a third plurality of channels that is different than the first plurality of channels and the second plurality of channels, and
   wherein the second wireless repeater hops between the first information channel and the second information channel and between each one of the third plurality of channels in the different ones of the superframes.

5. The system of claim 4 wherein the second wireless repeater is in a same level as the first wireless repeater,
   wherein, responsive to receiving the access point beacon, the second wireless repeater broadcasts a second wireless repeater beacon in the second slot of the one of the superframes on one of the third plurality of channels, wherein the one of the first plurality of channels, the one of the second plurality of channels, and the one of the third plurality of channels are associated with the one of the superframes, and wherein the second slot is shifted or offset from the first slot.

6. The system of claim 4 wherein the first wireless repeater is in a first level and the second wireless repeater is in a second level, wherein, responsive to receiving the first wireless repeater beacon, the second wireless repeater broadcasts a second wireless repeater beacon in a third slot of the one of the superframes on one of the third plurality of channels, wherein the one of the first plurality of channels, the one of the second plurality of channels, and the one of the third plurality of channels are associated with the one of the superframes, wherein the second slot is shifted or offset from the first slot, and wherein the third slot is shifted or offset from both the first slot and the second slot.

7. The system of claim 1 wherein the wireless access point assigns a first one of a plurality of devices the first information channel, the second information channel, and an initial operating channel sequence of the plurality of operating channel sequences to use for communicating directly or indirectly with the wireless access point, and wherein, when the first one of the plurality of devices fails to communicate with the wireless access point using the initial operating channel sequence, the first one of the plurality of devices uses the first information channel or the second information channel to identify a subsequent operating channel sequence of the plurality of operating channel sequences to use for communicating directly or indirectly with the wireless access point.

8. The system of claim 7 wherein the first one of the plurality of devices uses the first information channel or the second information channel to select the subsequent operating channel sequence based on a current location of the first one of the plurality of devices relative to a fixed location of the wireless access point or the first wireless repeater.

9. The system of claim 1 wherein the wireless access point scans a region in which the wireless access point is deployed to identify potential interference and selects the first information channel and the second information channel based on a level of the potential interference.

10. The system of claim 1 wherein the wireless access point selects the first information channel and the second information channel from a predefined list, and wherein the wireless access points selects the plurality of operating channel sequences from entries on the predefined list that are cross-referenced with the first information channel and the second information channel.

11. A method comprising:

operating a wireless access point in a frequency band and forming a first wireless network with the wireless access point;

selecting a first information channel, a second information channel, and a plurality of operating channel sequences from a plurality of wireless network channels used by the first wireless network;

assigning a first operating channel sequence of the plurality of operating channel sequences to the wireless access point and a second operating channel sequence of the plurality of operating channel sequences to a first wireless repeater, wherein the first operating channel sequence includes a first plurality of channels, and wherein the second operating channel sequence includes a second plurality of channels that is different than the first plurality of channels;

the wireless access point hopping between the first information channel and the second information channel and between each one of the first plurality of channels in different ones of superframes used the first wireless network;

the first wireless repeater hopping between the first information channel and the second information channel and between each one of the second plurality of channels in the different ones of the superframes;

broadcasting an access point beacon, via the wireless access point, in a first slot of one of the superframes on one of the first plurality of channels;

responsive to receiving the access point beacon, broadcasting a first wireless repeater beacon, via the first wireless repeater, in a second slot of the one of the superframes on one of the second plurality of channels, wherein the one of the first plurality of channels and the one of the second plurality of channels are associated with the one of the superframes, wherein the second slot is shifted or offset from the first slot;

hopping, via the wireless access point, from the one of the first plurality of channels to another of the first plurality of channels to rebroadcast the access point beacon in a first slot of the another of the superframes via the another of the first plurality of channels; and responsive to receiving the rebroadcasted access point beacon, hopping, via the first wireless repeater beacon, from the one of the second plurality of channels to another of the second plurality of channels to rebroadcast the first wireless repeater beacon in a second slot of the another of the superframes via the another of the second plurality of channels.

12. The method of claim 11 further comprising:

selecting a first one of the first plurality of channels and a first one of the second plurality of channels to overlap with a first one of a plurality of interfering channels of a second wireless network that operates in the frequency band;

selecting a second one of the first plurality of channels and a second one of the second plurality of channels to overlap with a second one of the plurality of interfering channels that is different than first one of the plurality of interfering channels; and selecting a third one of the first plurality of channels and a third one of the second plurality of channels to overlap with a third one of the plurality of interfering channels.

13. The method of claim 12 wherein the first wireless network includes a ZigBee network, the second wireless network includes a Wi-Fi network, the frequency band includes a 2.4 GHz band, and the plurality of interfering channels includes all of the Wi-Fi network.

14. The method of claim 11 further comprising:

the wireless access point assigning a third operating channel sequence of the plurality of operating channel sequences to a second wireless repeater, wherein the third operating channel sequence includes a third plurality of channels different than the first plurality of channels and the second plurality of channels; and the second wireless repeater hopping between the first information channel and the second information channel and between each one of the third plurality of channels in the different ones of the superframes.

15. The method of claim 14 further comprising:
responsive to receiving the access point beacon, broadcasting a second wireless repeater beacon from the second wireless repeater in the second slot of the one of the superframes on one of the third plurality of channels,
wherein the second wireless repeater is in a same level as the first wireless repeater,
wherein the one of the first plurality of channels, the one of the second plurality of channels, and the one of the third plurality of channels are associated with the one of the superframes, and
wherein the second slot is shifted or offset from the first slot.

16. The method of claim 14 further comprising:
responsive to receiving the first wireless repeater beacon broadcasting a second wireless repeater beacon from the second wireless repeater in a third slot of the one of the superframes on one of the third plurality of channels,
wherein the first wireless repeater is in a first level and the second wireless repeater is in a second level,
wherein the one of the first plurality of channels, the one of the second plurality of channels, and the one of the third plurality of channels are associated with the one of the superframes,
wherein the second slot is shifted or offset from the first slot, and
wherein the third slot is shifted or offset from both the first slot and the second slot.

17. The method of claim 11 further comprising:
assigning a first one of a plurality of devices the first information channel, the second information channel, and an initial operating channel sequence of the plurality of operating channel sequences to use for communicating directly or indirectly with the wireless access point; and
when the first one of the plurality of devices fails to communicate with the wireless access point using the initial operating channel sequence, using the first information channel or the second information channel to identify a subsequent operating channel sequence of the plurality of operating channel sequences to use for communicating directly or indirectly with the wireless access point.

18. The method of claim 17 further comprising:
using the first information channel or the second information channel to identify the subsequent operating channel sequence based on a current location of the first one of the plurality of devices relative to a fixed location of the wireless access point or the first wireless repeater.

19. The method of claim 11 further comprising:
scanning a region in which the wireless access point is deployed to identify potential interference; and
selecting the first information channel and the second information channel based on a level of the potential interference.

20. The method of claim 11 further comprising:
selecting the first information channel and the second information channel from a predefined list; and
selecting the plurality of operating channel sequences from entries on the predefined list that are cross-referenced with the first information channel and the second information channel.

* * * * *